United States Patent
Carrier et al.

(10) Patent No.: US 10,042,837 B2
(45) Date of Patent: *Aug. 7, 2018

(54) NLP PROCESSING OF REAL-WORLD FORMS VIA ELEMENT-LEVEL TEMPLATE CORRELATION

(71) Applicant: International Business Machines Corporation, Armonk, NY (US)

(72) Inventors: Scott R. Carrier, Apex, NC (US); Lee M. Surprenant, Cary, NC (US); Amy E. Veatch, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 465 days.

This patent is subject to a terminal disclaimer.

(21) Appl. No.: 14/557,613

(22) Filed: Dec. 2, 2014

(65) Prior Publication Data

US 2016/0154892 A1    Jun. 2, 2016

(51) Int. Cl.
| | |
|---|---|
| G06F 17/30 | (2006.01) |
| G06F 17/24 | (2006.01) |
| G06F 17/22 | (2006.01) |
| G06F 17/27 | (2006.01) |

(52) U.S. Cl.
CPC ........ *G06F 17/243* (2013.01); *G06F 17/2241* (2013.01); *G06F 17/241* (2013.01); *G06F 17/248* (2013.01); *G06F 17/278* (2013.01); *G06F 17/2725* (2013.01); *G06F 17/30684* (2013.01); *G06F 17/30702* (2013.01); *G06F 17/30731* (2013.01); *G06F 17/30876* (2013.01)

(58) Field of Classification Search
CPC ......... G06F 17/30684; G06F 17/30702; G06F 17/30731; G06F 17/30876
USPC ........................................... 707/691
See application file for complete search history.

(56) References Cited

U.S. PATENT DOCUMENTS

| | | | |
|---|---|---|---|
| 6,311,191 B1 | 10/2001 | Retallick | |
| 6,950,814 B2* | 9/2005 | Bergan | G06N 5/02 706/20 |
| 7,174,507 B2 | 2/2007 | Baudin et al. | |
| 7,249,117 B2* | 7/2007 | Estes | G06N 5/022 706/18 |

(Continued)

OTHER PUBLICATIONS

Imran Q, Sayed "Issue in Anaphora resolution", 2003.*

(Continued)

*Primary Examiner* — Jean M Corrielus
(74) *Attorney, Agent, or Firm* — Terrile, Cannatti & Chambers, LLP; Stephen A. Terrile

(57) ABSTRACT

A method, system and computer-usable medium are disclosed for identifying unchecked criteria within a form. Natural Language Processing (NLP) is applied to unstructured data within a target form to identify elements of a form structure. Analytic analysis is then applied to the resulting form structure elements to identify a hierarchical structure and associated element placement. Implicit selections within the form are then identified by applying rules based upon other selections and their orientation to anchor terms to determine the completeness of the form, based upon aggregation of form elements. The form structure elements and the hierarchy metadata are then processed logically reassemble the form's hierarchy in flattened forms for multilayer, sub-element anaphora resolution.

14 Claims, 9 Drawing Sheets

(56) References Cited

U.S. PATENT DOCUMENTS

| | | | |
|---|---|---|---|
| 7,426,496 | B2 | 9/2008 | Kristjansson |
| 7,912,701 | B1* | 3/2011 | Gray .................. G06F 17/27 704/257 |
| 8,015,143 | B2* | 9/2011 | Estes .................. G06N 5/022 704/9 |
| 8,370,387 | B2 | 2/2013 | Ebaugh et al. |
| 8,484,208 | B1* | 7/2013 | Raghavan ......... G06F 17/30554 707/728 |
| 8,756,234 | B1* | 6/2014 | Dreyer ............... G06F 19/3487 707/739 |
| 8,868,506 | B1 | 10/2014 | Bhargava et al. |
| 9,239,830 | B2* | 1/2016 | Gopalakrishnan ...... G06F 17/28 |
| 9,424,298 | B2 | 8/2016 | Bufe et al. |
| 9,424,299 | B2 | 8/2016 | Bufe et al. |
| 9,430,464 | B2 | 8/2016 | Carrier et al. |
| 9,535,902 | B1* | 1/2017 | Michalak ............... G06F 17/271 |
| 9,772,823 | B2 | 9/2017 | Allen et al. |
| 9,792,278 | B2 | 10/2017 | Byron et al. |
| 2006/0265253 | A1 | 11/2006 | Rao et al. |
| 2007/0100823 | A1 | 5/2007 | Inmon |
| 2007/0130134 | A1 | 6/2007 | Ramsey et al. |
| 2008/0016020 | A1* | 1/2008 | Estes .................. G06N 5/022 706/52 |
| 2008/0256128 | A1 | 10/2008 | Pierce et al. |
| 2009/0217149 | A1 | 2/2009 | Kamien et al. |
| 2011/0296291 | A1* | 12/2011 | Melkinov ........... G06F 17/2229 715/229 |
| 2011/0301941 | A1* | 12/2011 | De Vocht ............ G06F 17/2715 704/9 |
| 2013/0041921 | A1 | 2/2013 | Cooper et al. |
| 2013/0054695 | A1 | 2/2013 | Holman et al. |
| 2013/0282710 | A1* | 10/2013 | Raghavan ......... G06F 17/30554 707/728 |
| 2014/0046877 | A1* | 2/2014 | Gopalakrishnan ...... G06F 17/28 706/12 |
| 2014/0074826 | A1 | 3/2014 | Cooper et al. |
| 2014/0156628 | A1 | 6/2014 | Raichelgauz et al. |

OTHER PUBLICATIONS

Ching-Song D. Wei et al, Integration of Structured and Unstructured Text Data in a Clinical Information System, Transactions of the Society for Design and Process Science, Sep. 2006, vol. 10, No. 3, pp. 61-77.
List of IBM Patents or Applications Treated as Related.
International Search Report and Written Opinion of the International Searching Authority for PCT Application No. PCT/JP2014/005307 dated Nov. 18, 2014.
S. Hamada, IBM, Provision, Research: What Defines Big Data Values, Summer 2013, No. 78, Jul. 30, 2013, pp. 46-51.
Y. Kagawa et al., Extraction of Dependent Relationships Among Question and Answers in Community QA, The 5th Forum on Data Engineering and Information Management [online], The Institute of Electronics, Information and Communication Engineers, The Database Society of Japan, Information Processing Society of Japan, May 31, 2013, http://db-event.jpn.org/deim2013/proceedings/pdf/b6-2.pdf.
T. Kawai, Ryukoku University, Proceedings of the Thirteenth Annual Meeting of The Association for Natural Language Processing, Mar. 19, 2007, pp. 566-569.
IP.com, IBM, An general method to capture change of unstructured data within multiple Content Management System, Mar. 11, 2009.
Sokol, L. et al., Analytics in a Big Data Environment, 2012.
IP.com, IBM, Autocompletion Semi-Structured Documents Based on a Learned Set, Jun. 2, 2008.
IP.com, IBM, Using Proximity Based Classification and Presentation of Selection Options in Forms, May 18, 2010.
Anthem, Blue Cross and Blue Shield Association, Medical Policy, http://www.anthem.com/medicalpolicies/policies/mp_pw_a050280.htm, Oct. 8, 2013.
R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

502
⎫
⎬ Please check all that apply to the individual :
⎭

⌐ Request is for Invasive (inserted at the time of surgery) method of electrical bone
⎨ growth stimulation (EBGS)
504

⌐ xRequest is for the Noninvasive (beginning at any time from the time of surgery until
⎨ up to 6 months after surgery) method of electrical bone growth stimulation (EBGS)
506

Request is for the Semi-Invasive method of electrical bone growth stimulation (EBGS)

⌐ xRequest is for invasive or noninvasive electrical bone growth stimulation for spinal
⎨ fusion surgery for an individual that is high risk for pseudoarthrosis (check all that apply):
508

One or more previous failed spinal fusion(s)

Grade III or worse spondylolisthesis

⌐ xFusion to be performed at more than one level
⎨
510 History of tobacco use or alcoholism Diabetes Renal disease Other metabolic disease where bone healing is likely to be compromised or growth is
poor (please list disease):

Obese individual with a Body Mass Index (BMI) greater than 30 or weighs greater than
50% over his/her ideal body weight (IBW)*

Individual Height:

512 Individual Weight:
⎬ Other (please list): User input text entered here

⌐ Request is for Noninvasive EBGS for individual with failed spinal fusion (check all that
⎨ apply):
514

A minimum of 6 months has passed since date of the original surgery

Serial x-rays or appropriate imaging studies confirm there is no evidence of progression
516 of healing for 3 months during the latter portion of the 6 month period
⎬ Other:

⌐ Request is for treatment of fracture nonunions or congenital pseudoarthroses of long or
⎨ short bones of the appendicular skeleton : (check all that apply)
518

At least 45 days have passed since date of fracture or the date of surgical treatment of fracture Serial radiographs or appropriate imaging studies confirm no progressive signs of healing
have occurred 520 Fracture gap is less than one centimeter
⎬ Other:

Request is for treatment of joint fusion secondary to failed arthrodesis of the ankle or knee Request is for noninvasive treatment of individual with synovial pseudoarthroses or draining
Osteomyelitis Request is for treatment as an adjunct (i.e. at the time of or immediately after) to a bunionectomy
procedure Request is for treatment of, fresh fractures or delayed/incomplete union fractures Request is for treatment of spondylolysis or pars interarticularis defect

602 — X Request is for invasive or noninvasive electrical bone growth stimulation for spinal fusion surgery for an individual that is high risk for pseudoarthrosis (check all that apply ):

One or more previous failed spinal fusion(s)

Grade III or worse spondylolisthesis

604 — X Fusion to be performed at more than one level

History of tobacco use or alcoholism

Diabetes

Renal disease

Other metabolic disease where bone healing is likely to be compromised or growth is poor (please list disease):

Obese individual with a Body Mass Index (BMI) greater than 30 or weighs greater than 50% over his/her ideal body weight (IBW)*

Individual Height:

Individual Weight:

606 — Other (please list): User input text entered here

702 — Request is for invasive or noninvasive electrical bone growth stimulation for spinal fusion surgery for an individual that is high risk for pseudoarthrosis (check all that apply ):

One or more previous failed spinal fusion(s)

704 — X Grade III or worse spondylolisthesis

X Fusion to be performed at more than one level

History of tobacco use or alcoholism

Diabetes

Renal disease

Other metabolic disease where bone healing is likely to be compromised or growth is poor (please list disease):

Obese individual with a Body Mass Index (BMI) greater than 30 or weighs greater than 50% over his/her ideal body weight (IBW)*

Individual Height:

Individual Weight:

706 — Other (please list): Some other text in here

✗ Request is for the Noninvasive (beginning at any time from the time of surgery until up to 6
　months after surgery) method of electrical bone growth stimulation (EBGS)
802
　✗ Request is for treatment of joint fusion secondary to failed arthrodesis of the ankle or knee
804

Request is for the Noninvasive (beginning at any time from the time of surgery until up to 6
　months after surgery) method of electrical bone growth stimulation (EBGS)
902
　Request is for treatment of joint fusion secondary to failed arthrodesis of the ankle or knee
904

**Request is for Invasive (inserted at the time of surgery) method of electrical bone growth
stimulation (EBGS)**
1002
　✗ Request is for the Noninvasive (beginning at any time from the time of surgery until up to 6
　months after surgery) method of electrical bone growth stimulation (EBGS)
1004
　Request is for the Semi-Invasive method of electrical bone growth stimulation (EBGS)
1006
　✗ Request is for treatment of joint fusion secondary to failed arthrodesis of the ankle or knee
1008

FIGURE 10

NLP PROCESSING OF REAL-WORLD FORMS VIA ELEMENT-LEVEL TEMPLATE CORRELATION

CROSS-REFERENCE TO RELATED APPLICATION

U.S. patent application Ser. No. 14/136,314, entitled "Identifying Unchecked Criteria in Unstructured and Semi-Structured Data" by inventors Scott R. Carrier, Elena Romanova, and Marie L. Setnes, filed on Dec. 20, 2013, describes exemplary methods and systems and is incorporated by reference in its entirety.

BACKGROUND OF THE INVENTION

Field of the Invention

The present invention relates in general to the field of computers and similar technologies, and in particular to software utilized in this field. Still more particularly, it relates to a method, system and computer-usable medium for identifying unchecked criteria within a form.

Description of the Related Art

Paper-based forms, and their electronic equivalents, are commonly used by government, commercial and private entities alike to collect a wide variety of information. While individual forms may be unique, they typically include a variety of questions that have associated checkboxes that can be marked in various ways, blank fields to be populated with input data, or a combination of both. As with the collection of any kind of information, certain types, formats, or ranges of information are expected for certain fields. For example, a form used for tracking a delivery may include fields for "arrival date" and "arrival time," which would be respectively completed with a valid date and time of day.

Likewise, it is expected that certain rules or guidelines need to be adhered to when completing a form. If the rules are followed properly, then all pertinent checkboxes are marked, blank fields are appropriately populated, and complete and accurate information can be collected from the form. However, it's not uncommon for a person to inadvertently fail to complete a form for any number of reasons. For example, it may be unclear that certain checkboxes or fields are associated with a particular question on the form. As another example, the person may simply have not understood that one or more checkboxes must be marked or that certain blank fields must be filled out. As yet another example, the form may even have sections of text that includes questions that have no obvious checkboxes or blank fields. It will be appreciated that many hours or even days may have passed by the time these omissions are discovered, making it difficult to collect all of the information needed to properly provide associated goods or services.

These issues are often exacerbated by the fact that checklist form data may be multi-dimensional. That is, some text may be checked and some may not. Furthermore, text criteria spans that are checked may need to be handled differently than those that are unchecked. Moreover, they typically need to be handled differently when processed by a knowledge-based system, such as Watson™, available from International Business Machines (IBM™). For example, it can prove challenging to detect form criteria without relying upon headers. Additional challenges include discerning the completeness of a given form, its nested structure, and the orientation of associated checkboxes. Likewise, it is often difficult to distinguish form sections when headings look like any other text or there are no line spaces between sections. Other challenges include user manipulation of form data, such as when applicable criteria is copied and pasted without including accompanying checkmarks to distinguish between checked and unchecked criteria. Furthermore, anaphora resolution is often difficult to infer when hierarchical form data is flattened. Nonetheless, unchecked criteria cannot be simply ignored either, as it may signify a negation or otherwise contribute to identifying the correct or best answer to a question in the form.

SUMMARY OF THE INVENTION

A method, system and computer-usable medium are disclosed for identifying unchecked criteria within a form. In various embodiments, unstructured text within a form is converted to resolve hierarchical references. In these embodiments, Natural Language Processing (NLP) is applied to unstructured data within a target form to identify elements of a form structure. Analytic analysis is then applied to the resulting form structure elements to identify a hierarchical structure and associated element placement. Implicit selections within the form are then identified by applying rules based upon other selections and their orientation to anchor terms to determine the completeness of the form, based upon aggregation of form elements. The form structure elements and the hierarchy metadata are then processed logically reassemble the form's hierarchy in flattened forms for multi-layer, sub-element anaphora resolution.

In various embodiments, the hierarchy metadata is captured from within the form and is used to identify a structure associating child elements with parent elements. In certain embodiments, the hierarchy metadata is used to identify one or more option types, checkbox orientation, or to validate input data. In various embodiments the hierarchy metadata is used to identify implicit checkmarks or incomplete forms. In certain embodiments, the hierarchy metadata is used to disambiguate the orientation of checkmarks to their anchor terms. In various embodiments, the analytic analysis characterizes the form based upon a criteria. In certain embodiments, options are provided to adjust the metadata and analytic analysis. In these embodiments, the adjustments include adjusting the counts of sequential contiguous elements, counts of contiguous elements, matching criteria, and term-checking rules.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 shows annotated natural language text generated a result of a complete form match;

FIG. 6 shows annotated natural language text generated as a result of a sub-form match;

FIG. 7 shows annotated natural language text generated as a result of a sub-form match with an inferred checkmark;

FIG. 8 shows annotated natural language text generated as a result of a partial form match with only checked items;

FIG. 9 shows annotated natural language text generated as a result of a partial form match with only unchecked items;

FIG. 10 shows annotated natural language text generated as a result of a partial form match with mixed items;

DETAILED DESCRIPTION

Figure 1:
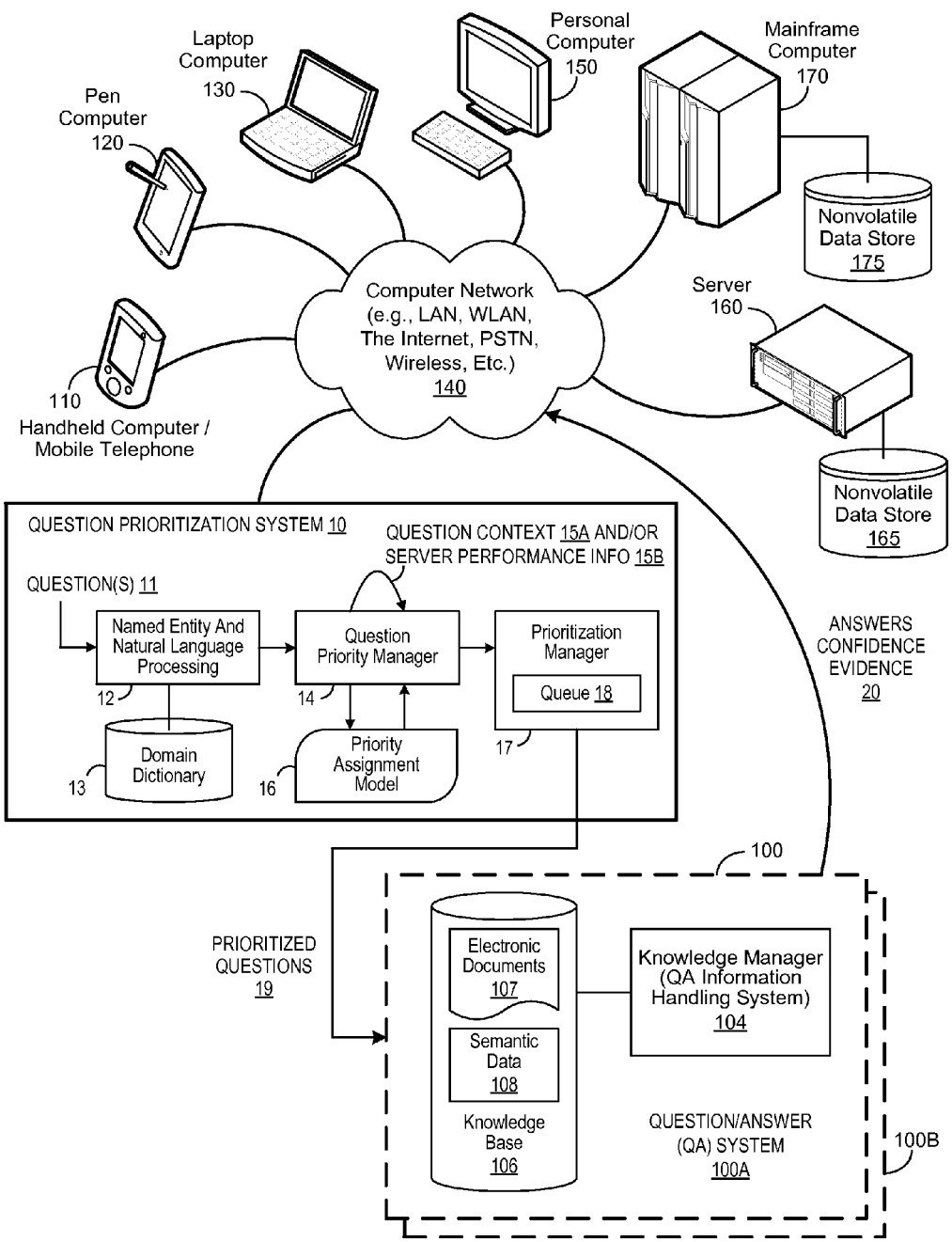
FIG. 1 depicts a schematic diagram of one illustrative embodiment of a question prioritization system and question/answer (QA) system connected to a computer network.

A method, system and computer-usable medium are disclosed for identifying unchecked criteria within a form. The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 140. Types of computer network 140 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
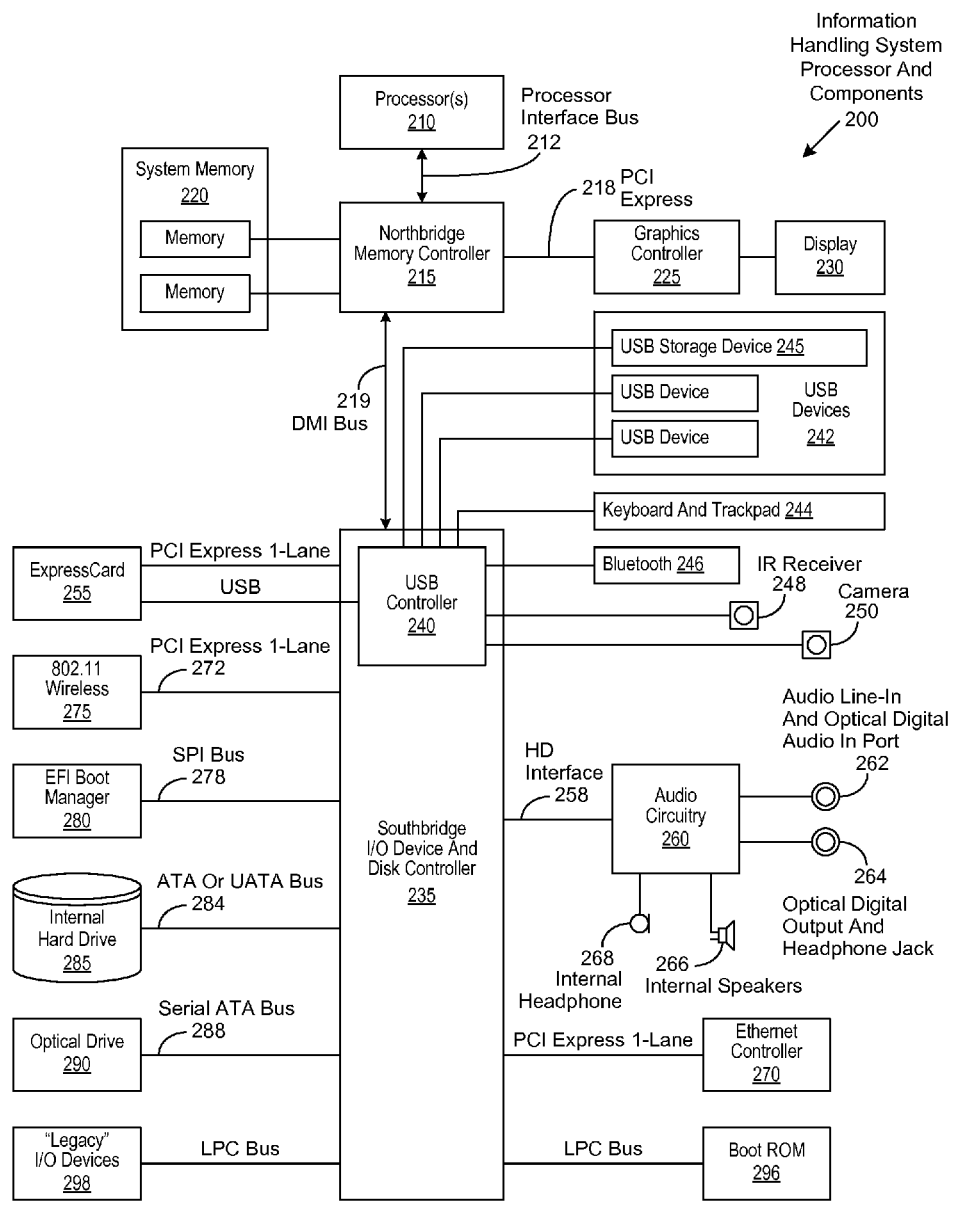
FIG. 2 is a simplified block diagram of an information handling system capable of performing computing operations.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
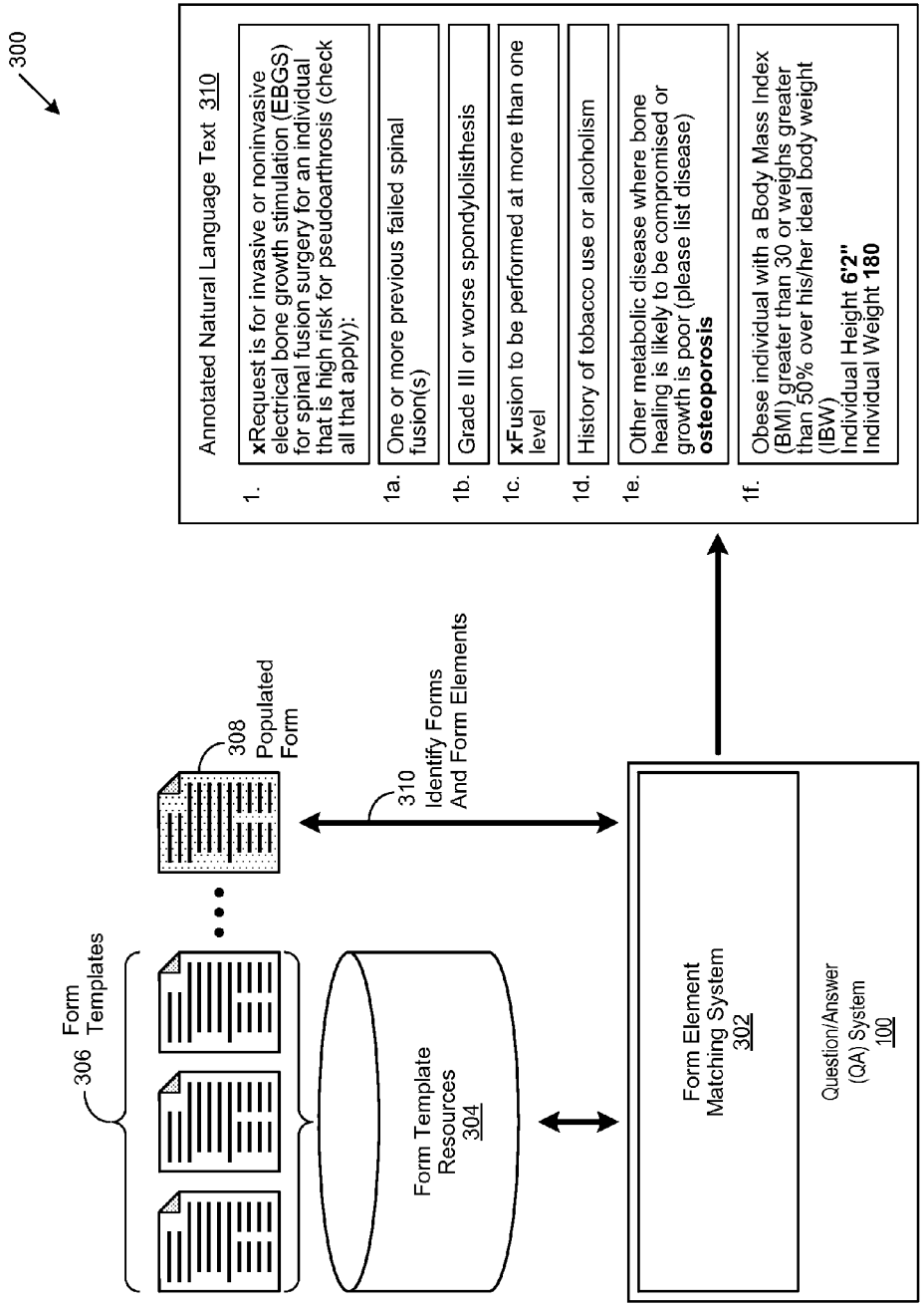
FIG. 3 is a simplified block diagram of a form criteria identification system used to identify checked and unchecked criteria within a form.

FIG. 3 is a simplified block diagram of a form criteria identification system implemented in accordance with an embodiment of the invention to identify checked and unchecked criteria within a form. As used herein, checked criteria broadly refers to a discrete item within a structured, semi-structured, or unstructured text, such as a printed or electronic form, that represents an explicit or implied question that has a corresponding response. Conversely, unchecked criteria broadly refers to a discrete item within a structured, semi-structured, or unstructured text, such as a printed or electronic form, that represents an explicit or implied question that lacks a corresponding response. In this embodiment, the form criteria identification system 300 includes a question/answer (QA) system 100, such as the IBM Watson™ QA system available from International Business Machines Corporation of Armonk, N.Y. In various embodiments, the QA system 100 may include a form element matching system 302. In these and other embodiments, the QA system 100 is trained to answer questions based on real-world, form-based input commonly used in domains such as the medical industry.

Skilled practitioners of the art will recognize that text identified as unchecked criteria within such form-based input serves many functions within a QA system 100. For example, unchecked criteria can be omitted from Natural Language Processing (NLP) scorers such as text alignment, n-gram, etc. to prevent false positives. Alternately, unchecked criteria can be rewritten to embody its context as unchecked, thus making it suitable for NLP scorers such as text alignment, n-gram etc. To further the example, if "_Diabetes" is unchecked in a form identifying the medical conditions of the patient, a statement such as "The patient does not have diabetes." can be generated for consumption by NLP scorers.

Conversely, checked or unchecked criteria can interchangeably represent positive or negative statements according to the context of the form. Using the diabetes example, if the form header read "Patient does not have any of the following criteria:" then an unchecked "_Diabetes" would be an indicator that the patient has diabetes (i.e., a positive condition). Optionally, functions such as machine learning or other statistical models can be employed to identify which scorers best interpret or employ the unchecked criteria to arrive at the best correct answer. Accordingly, it is known for QA systems 100 answer an implicit question of whether or not a patient meets eligibility criteria defined for clinical trials, insurance guidelines, and so forth. It will likewise be appreciated that simply ignoring unchecked criteria or assuming all concepts therein are negated may result in insufficient or incorrect results when processing form-based input.

In various embodiments, text spans representing unchecked criteria within unstructured or semi-structured text within a form are detected and classified to facilitate accurate interpretation of the text. In these embodiments, checkmarks are detected in a variety of forms (e.g., "_x," "X," "1," "xSomeWord," etc.) which appears before or after anchor text. In various embodiments the checkmarks may denote Boolean or multi-value attributes of the anchor text. For example, "X" Request is for procedure XYZ, patient has a history of high blood pressure? "X Yes _No," physical exam palpitations: "_Spleen, _X_Liver, _Lymph Nodes," and so forth. In certain embodiments, inference of a checkmark association is determined via edge checkmark structure within a document or proximity to term attribute in the absence of a check box indicator. For example, "X Spleen Liver Lymph Nodes," where spleen is checked and such checkmarks appear to the left of the term, or "Spleen Liver X Lymph nodes," where it is detected that 'X' is closer to Lymph Nodes than the other choices.

In various embodiments, target text is processed using Natural Language Processing (NLP) approaches familiar to skilled practitioners of the art to partition the text into groups of conceptually-related content. One known branch of NLP pertains to transforming a given corpus of content into a human usable language or form that facilitates the exchange of information between humans and data processing systems. For example, NLP can accept a document whose content is in a computer-specific language or form, and produce a document whose corresponding content is in a human-readable form. In various embodiments, groups of conceptually-related content, also referred to herein as concept groups, typically contain contiguous portions of text. In certain embodiments, the concept groups represent section headers associated with one or more other concept groups. In various embodiments, the headers may be implemented to organize data into various cells into headings, categories, or classifications. The headers are implemented as row-headers. In certain embodiments, the headers are not limited to boundaries or extremities. In various embodiments, a header may be implemented in the form of a sub-header, for example, to identify a sub-category of data. However, these concept groups are not necessarily limited to such and may in fact identify related portions of text regardless of the existence or non-existence of section headers.

For example, when there are no obvious section headings in the textual content, a change of subject or topic can still be detected in various embodiments due to the difference in affinity of concept groups. For example, a portion of text describing drugs and various types of cancer would contain particular semantic concepts, whereas a text about zoological gardens would contain references to animals, and natural habitats, etc., which are different semantic concepts from the portion of text describing drugs and cancer types. Changes in such concept groupings are identified in various embodiments to identify related portions of text whether or not these portions of text have associated section headers. In certain embodiments, section headers may be inferred based upon concepts identified in the portions of text.

In various embodiments, related concepts are grouped together into concept groups, to distinguish between portions of text associated with these concept groups, even within the same contiguous portion of text, in order to split the portions of text into separate sections without any structural clues. In machine learning terms, such clues contained in a set of all possible supporting clues is called a "feature." Presence or absence of a feature for an existing hypothesis increases or decreases the confidence level in that hypothesis. In one embodiment, a "model" is an approach to computing the confidence score for a hypothesis based on a subset of features that are present, or support, the hypothesis.

In another embodiment, the model operates as a rule-based engine. In yet another embodiment, the model is 'trainable' by using a training set of tables for which confidence score is known a priori (i.e., a "labeled set").

In certain embodiments, these groupings or clusters of concepts within the textual content may be recognized using an existing knowledge base. In these embodiments, labels may be assigned to the various resulting sections of text in the output metadata for the portion of content (e.g., a document or the like). In addition, as a result of groupings or clusters of concepts being identified within the portion of content, those pieces of the portion of content that are not part of the groupings or clusters and thus, not related, can be identified. It will be appreciated that these abilities would be helpful in assisting with textual content processing, such as by a text search system, QA system, or other information extraction system.

In certain embodiments, a section of text within the textual content, (e.g., documents or other portions of text) is identified as a section heading in the content being processed and is associated with the remaining text in the content. Skilled practitioners of the art will recognize that the identification of a section heading may be done in many ways, including identifying the section heading as a sentence containing a single word, or a small number of words less than a predetermined threshold number of words, followed by a line break. A colon character, or other special character, appended to a sentence may be taken as additional evidence to indicate that the word or phrase is a section heading. The paragraph(s) of text immediately following the identified section heading are then understood to be the related body of text. Other, more sophisticated, approaches to identifying section headers and corresponding text may use statistical methods or pattern rules based on known section heading keywords and formatting characters.

It will likewise be appreciated that certain challenges exist in determining the boundary of the text associated with the particular section heading (i.e., the related section text). One approach is to identify the related section text as the text appearing immediately after a section header and continuing until the end of the paragraph is encountered or until a next section header is encountered in the text of the content. Such approaches often misrepresent the subject matter of the section content, as there may be several sets of subject specific content within a single paragraph or portion of text appearing between section headers. Moreover, in approaches where related text is assumed to be immediately subsequent to the section header and continues until a new section header is encountered, a difficulty may arise when there is no other section headers in the document. Thus, subsequent paragraphs or portions of text may not have an explicit semantic link to the most recent section header. Moreover, in some cases a section can end with a single line, a character, or the like, that makes that portion of text appear to be another section header when it is not intended to be one.

In various embodiments, the preceding issues are addressed by linking text following a particular section header (or section heading) only if there is a semantic link to that section header. For example, in the medical domain, the Logic Observation Identifiers Names and Codes (LOINC) are used to identify particular sections in a patient's medical history record document. These codes can greatly facilitate ensuring accurate automated analysis of the patient's case or in determining appropriate treatment. However, determining the most appropriate LOINC code to be applied to a section can prove difficult when there are no obvious indications of section delimiters from the structure or format of the document. In such cases, the content of the text itself must be analyzed for named entities related to particular section types. There are many ways in which these named entities can be considered to indicate a particular section or LOINC code. An example of this is the order in which these named entities, or ordered clusters of such entities, appear in the text.

In certain embodiments, concept affinities are based upon semantic interaction of concepts with each other. Such concept affinities may be affinities between identified concepts in textual content and proposed section headings or semantic categories or subject matter, affinities between individual concepts for clustering of related entities, affinities between sets of clusters of concepts to thereby distinguish related and unrelated portions of text, and the like. In various embodiments, the concept affinities are identified within the context of the structural elements of the portion of content, where the portion of content may be in the form of documents, portions of text, web pages, scanned-in documents, or the like (referred to hereafter collectively as simply "documents").

In various embodiments, document sections, including headings, contain discussions on topics which are described by a set of interacting and strongly related concepts. For example, a "Medications" section may contain mentions of concepts of type "Drug," and a mention of a type of "Drug" may be contained in a section following a heading "Medications." Likewise, it is likely that concepts of the type "Dosage," "Route," "Frequency," and "Adverse Drug Reaction" will also be mentioned in the sentences which make up that section. Linked groups of concepts or topics often are indicative of a section in a document whether or not a section heading is present. In certain embodiments, the foregoing is used to score portions of a document in order to determine section boundaries and associate these sections with corresponding section headings, if such section headings are present, or with proposed section headings in some illustrative embodiments.

In certain embodiments, potential sections of a document are identified based upon topic or concept groupings and a scoring methodology when it is processed. In these embodiments, the identification of potential sections and the scoring methodology may be applied to determine the affinity of sections to each other and to existing or proposed (i.e., inferred) section headings. These section headings are generated based upon the result of semantic content concept grouping or clustering at each granularity level (e.g., word, sentence, paragraph, or the like). The affinity of each section to an actual or inferred section heading and to each other is then calculated. Overlapping sections are possible and the final section assignment and selection is based on choosing the highest scoring section heading, section text and section text pairs that cover the document in a non-overlapping manner.

Accordingly, various embodiments do not depend upon structure delimiters, such as paragraph breaks, special characters, or the like, to link sections of text with each other or sections of text with corresponding section headers, actual or inferred. Instead, the textual content is analyzed to identify concepts within the section text and any actual or inferred section headers based on ontologies, semantic networks, and other knowledge bases. The resulting section texts are then correlated with one another and with the section headings, inferred or otherwise, so as to generate metadata (e.g., annotations) that link sections of text with each other and/or corresponding actual or inferred section headings, general semantic categories, or the like. In these embodiments, the correlations are based on relatedness of concept groups or clusters, which gives a strong indicator of semantic affinity. The scoring mechanisms of these embodiments provide a manner by which such affinities may be quantified and used as a basis for selecting section assignments for annotating documents for use with analytical mechanisms, such as natural language processing (NLP) systems, Question and Answer (QA) systems, or the like.

In certain embodiments, the form elements may include form criteria, which may be checked, unchecked, or appended with user-provided input. In various embodiments, the form elements may include text, such as section headers or other information. In certain of these embodiments, the form metadata may include hierarchical relationships between form elements, input type variants, orientation of checkboxes to anchor text, and so forth. In various embodiments, the use of such form metadata reduces the need for checkbox indicators within section headers (e.g., "check all that apply") and the inferencing of checklist sections via detection of checkmarks within a section.

Referring now to FIG. 3, form metadata associated with a populated form 308 is used in various embodiments to identify and process form elements associated with the populated form 308. In these and other embodiments, form template resource management operations are initiated by the form element matching system 302 first selecting a target form template 306 to generate one or more associated form template resources 304. In one embodiment, the form template resources 304 are manually generated by using associated metadata to manually mark-up the target form template 306. In one embodiment, the associated metadata includes data related to the structure of the target form template 306. For example, individual elements, or criteria, in the target form template 306 may have associated child elements. In various embodiments, the child elements may be indented from their corresponding parent elements. In certain embodiments, the child elements may not be indented from their corresponding parent elements, making it difficult to discern that the child elements are not in fact independent, or non-child, form elements. In various embodiments, the associated metadata includes data related to the option type of a form element, such as a check box or checklist, "yes/no" selections, blank text fields, and so forth. In certain embodiments, the associated metadata includes orientation data associated with the spatial placement of such option types respective to their corresponding form elements or criteria. For example, various option types may be placed to the left, to the right, or below a corresponding form element or criteria. In various embodiments, the associated metadata includes validation data associated with various form elements or criteria. As an example, only one choice may be allowed from a selection of criteria within a form. As another example, the selection of at least one or more criteria may be required from a selection of criteria. As yet another example, it may be required that a predetermined blank text field be populated. Skilled practitioners of the art will recognize that many such embodiments are possible and the foregoing is not intended to limit the spirit, scope or intent of the invention.

In various embodiments, a form template resource corresponding to the target form template is automatically generated in step 1110 by using associated metadata to automatically mark-up the target form. For example, style sheet or other formatting information typically used by word processing systems such as Microsoft Word®, available from Microsoft of Redmond, Wash., may be used to identify the structure of the target form and its associated elements.

In various embodiments, form criteria identification operations are initiated by receiving a populated form 308, which is then processed by the form element matching system 302 to identify 310 its associated form elements. The identified form elements are then compared by the form element matching system 302 to various form template resources 304, described in greater detail herein.

A determination is then made whether there is complete or partial match between the populated form 308 and an existing form template 306. If so, then form template resource 304 metadata associated with the existing form template 306, described in greater detail herein, is used to associate the form template's 306 hierarchy with the populated form 308. Individual form elements within the populated form 308 are then matched to associated policy and effective dates, likewise described in greater detail. Natural Language Processing (NLP) is then used by the form element matching system 302 to generate annotated natural language text 310 containing checked and non-checked form elements within the populated form 308. As shown in FIG. 3, form elements '1', '1c', '1e' and '1f' are annotated as checked and form elements '1a', '1b', and '1d' are annotated as unchecked within the annotated natural language text 310. More specifically, form '1' and '1c' are annotated with an 'x' preceding the form element text, indicating that the form element had been checked as a result of user input. Likewise, form elements '1e' and '1f' are annotated as being checked as a result of respectively receiving user input of osteoporosis for a type of disease, a height of 6'2", and a weight of 180 into a blank text field associated with the form elements.

In various embodiments, the NLP annotation performed by the form element matching system 302 is augmented by one or more policies, effective dates, or both, that were previously associated with individual form elements. In certain embodiments, associated form templates 306 are referenced during the NLP annotation performed by the form element matching system 302 to improve tokenization of words such as "xRequest," which was originally captured as a checked criteria of "Request." In various embodiments, form configuration values are used by the form element matching system 302 in combination with NLP to perform the annotation.

In one embodiment, the form configuration values are used to check for the orientation (e.g., left, right, below, etc.) of checklist options in relation to a predetermined form element. In another embodiment, the form configuration values reference the number of sequential contiguous elements from the same form, which as used herein refer to elements that occur directly above or below each other in both the form and the text. In yet another embodiment, the form configuration values reference the number of contiguous elements from the same form, which as used herein refer to elements that occur one-after-another within text in the form.

In one embodiment, the form configuration values reference the type or level of a match, such as an exact or verbatim match versus a fuzzy match, which may be advantageous as a predetermined form evolves over time. In another embodiment, the form configuration values reference pre- and post-element term checking, such as how tokens are identified when they occur on the same line before a checkbox or a text element. In yet another embodiment, the form configuration values reference how standalone elements that are unchecked are annotated, such as when no elements within a group of contiguous form elements are checked. In one embodiment, the form configuration values reference the number of sentences allowed between contiguous elements in the case of a "text" option. In another embodiment, the form configuration values reference whether to infer checked elements for complex elements based on sub-form content.

In certain embodiments, a high confidence value is associated with checked criteria within a populated form 308 and the use of form configuration values is not necessary. In various embodiments, a high confidence value is likewise associated with unchecked criteria within a populated form 308 that is designated as being complete and the use of form configuration values is not necessary. However, in certain embodiments, identifying unchecked criteria in incomplete forms may prove challenging and form configuration values are implemented as described in greater detail herein. In various embodiments, the product of the confidence values associated with various configuration settings provides a total confidence value for each checked and unchecked element annotation. Those of skill in the art will recognize that many such embodiments are possible and the foregoing is not intended to limit the spirit, scope or intent of the invention.

In various embodiments, individual form elements are identified within a document, such as a populated form 308, without relying upon section headers, checkmark indicators, and so forth. In certain embodiments, individual form elements of a populated form 308 are identified and aggregated to determine the completeness, cohesiveness, or both, of its associated structure. In various embodiments, form hierarchy metadata is used by the form element matching system 302 to logically re-assemble hierarchy in flattened forms for multi-layer sub-element anaphora resolution.

In certain embodiments predetermined rules a form's metadata is used to identify implicit checkmarks, flag incomplete forms, or both. For example, a parent option is checked, but none of the sub-options in support of the parent option are checked. In various embodiments, a form's metadata is used to disambiguate the orientation of checkmarks to their anchor terms. It will be appreciated that doing so may be useful when checkmarks appear between terms in a multi-column checklist, when checkmarks sometimes appear to the right of the criteria, and so forth. Skilled practitioners of the art will recognize that many such embodiments are possible and the foregoing is not intended to limit the spirit, scope or intent of the invention.

Figure 4:
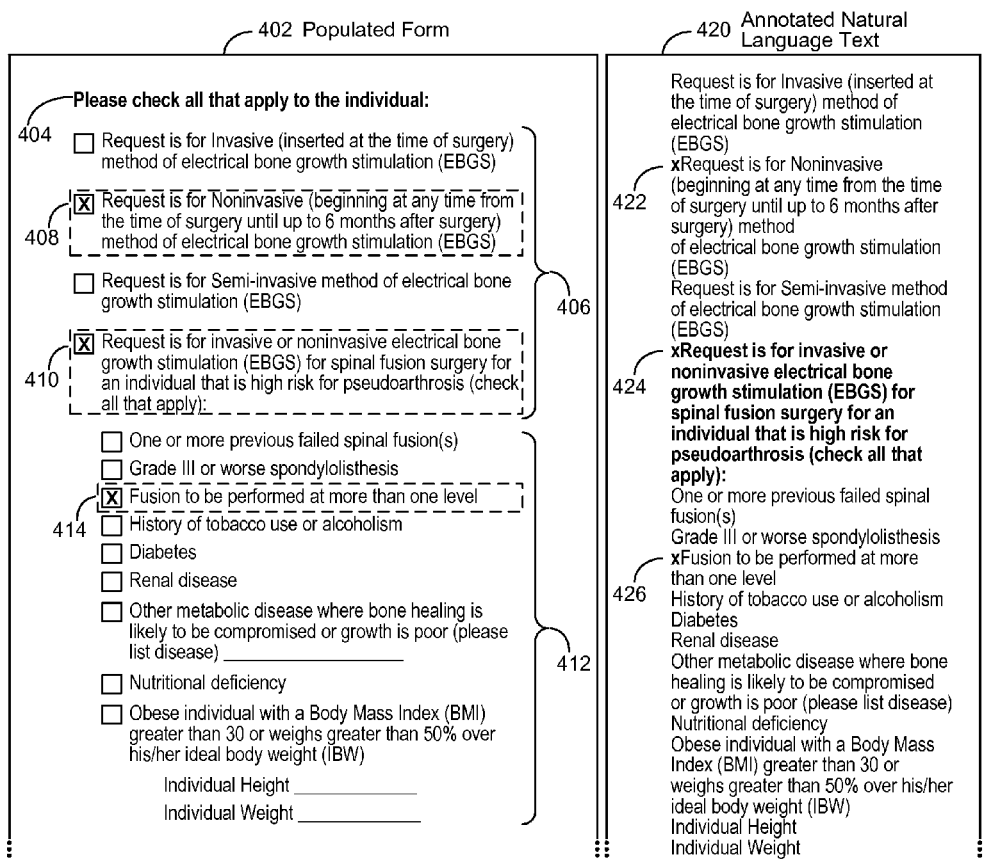
FIG. 4 shows the identification of unchecked criteria within a form.

FIG. 4 shows the identification of unchecked criteria within a form implemented in accordance with an embodiment of the invention. In this embodiment, form configuration values are implemented as described in greater detail herein for the number of sequential contiguous elements from the same form to generate a confidence value for unchecked element annotation. For example, a confidence value of '1' may be generated if the number of sequential contiguous elements from the same form is greater than or equal to '5', and a confidence value of '0.5' if the number of sequential contiguous elements is equal to '2'. Likewise, a confidence value of '1' may be generated if the number of contiguous elements from the same form is greater than or equal to '5', a confidence value of '0.5' if the number of contiguous elements is equal to '4', and a confidence value of '0.0' if the number of contiguous elements is less than or equal to '3'.

In this same embodiment, form configuration values are likewise implemented to reference the type or level of a match, such as an exact or verbatim match versus a fuzzy match to generate a confidence value for checked or unchecked items based upon the level of match. For example, a confidence level of '1' may be generated if the configuration value for the level of match is equal to '1', signifying an exact match. Likewise, a confidence level of '0' may be generated if the configuration value for the level of match is less than '1', signifying that fuzzy matching is disabled. Likewise, form criteria values of "false' and "true" are respectively implemented in this embodiment to allow tokens before and after checkmarks+form elements. Additional form criteria values implemented in this embodiment include "checked" for stand-alone unchecked elements, "2 sentences" for maximum text length, and "true" for inferred checked elements.

Referring now to FIG. 4, a populated form 402 is processed as described in greater detail herein to generate annotated natural language text 420. As shown in FIG. 4, populated form 402 includes a section header, sequential contiguous form elements 406, and contiguous form elements 406. As likewise shown in FIG. 4, checked form elements 408 and 410 result in annotated natural language text 420 elements 422 and 424 respectively being annotated as checked. Likewise, the contiguous form elements 406 are child form elements of the sequential contiguous form element 410. Accordingly, the contiguous form element 414 results in the annotated natural language text 420 element 426 likewise being annotated as checked.

FIG. 5 shows annotated natural language text generated in accordance with an embodiment of the invention as a result of a complete form match. In this embodiment, the configuration values defined in the descriptive text associated with FIG. 4 are implemented to generate the annotated natural language text 500, which corresponds to a processed form that is complete. As shown in FIG. 5, all form elements within the annotated natural language text 500 are present and sequentially contiguous. Likewise, form element 502 is not a criteria, but an instruction element instead. Accordingly, it is not annotated as being checked or unchecked. As likewise shown in FIG. 5, checked form elements 506, 508, and 510 are annotated as checked. Likewise, unchecked form elements 504, 512, 514, 516, 518 and 520 are annotated as unchecked with confidence value of '1' In this embodiment, the value of the form element "Other (please list):" 512 contains only one sentence. As a result, the configuration value corresponding to a two sentence maximum limit results in all form elements being treated as contiguous.

FIG. 6 shows annotated natural language text generated in accordance with an embodiment of the invention as a result of a sub-form match. In this embodiment, the configuration values defined in the descriptive text associated with FIG. 4 are implemented to generate the annotated natural language text 600, which corresponds to a portion of a processed form. As shown in FIG. 6, all 13 form elements within the annotated natural language text 600 are sequentially contiguous. As likewise shown in FIG. 6, checked form elements 602 and 604 are annotated as checked. Likewise, unchecked form element 606 is annotated as unchecked with confidence value of '1'.

FIG. 7 shows annotated natural language text generated in accordance with an embodiment of the invention as a result of a sub-form match with an inferred checkmark. In this embodiment, the configuration values defined in the descriptive text associated with FIG. 4 are implemented to generate the annotated natural language text 700, which corresponds to a portion of a processed form. As shown in FIG. 7, the parent form element 702 was not originally checked in the processed form. However, since checked elements 704 were identified in the form hierarchy below it, it was inferred that the parent form element 702 should have been checked. Accordingly, it is annotated as such in the annotated natural language text 700 as a result of the implementation of "infer checked elements=true" as a configuration value. As likewise shown in FIG. 7, unchecked form element 606 is annotated within the annotated natural language text 700 as unchecked with confidence value of '1'.

FIG. 8 shows annotated natural language text generated in accordance with an embodiment of the invention as a result of a partial form match with only checked items. In this embodiment, the configuration values defined in the descriptive text associated with FIG. 4 were implemented to generate the annotated natural language text 800, which corresponds to a portion of a processed form that contained two checked form elements. Accordingly, form elements 802 and 804 are annotated in the annotated natural language text 800 as being checked.

FIG. 9 shows annotated natural language text generated in accordance with an embodiment of the invention as a result of a partial form match with only unchecked items. In this embodiment, the configuration values defined in the descriptive text associated with FIG. 4 are implemented to generate the annotated natural language text 900, which correspond to a portion of a processed form containing two unchecked form elements. Accordingly, form elements 902 and 904 are annotated in the annotated natural language text 900 as being checked as a result of the implementation of the configuration value "stand-alone unchecked items=checked." In one embodiment, form elements 902 and 904 are annotated in the annotated natural language text 900 as being unchecked. In another embodiment, the form elements 902 and 904 are not annotated as being checked or unchecked in the annotated natural language text 900.

FIG. 10 shows annotated natural language text generated in accordance with an embodiment of the invention as a result of a partial form match with mixed items. In this embodiment, the configuration values defined in the descriptive text associated with FIG. 4 are implemented to generate the annotated natural language text 1000, which corresponds to a portion of a processed form containing four form elements, two of which were checked and two that were unchecked.

As shown in FIG. 10, the first three of the four form elements 1002, 1004 and 1005 are sequentially contiguous, with the checked form element 1004 annotated as checked. However, the generation of a confidence value of '1' resulting from the number of sequential contiguous elements being less than or equal to '3', form elements 1002 and 1006 are annotated as being unchecked within the annotated natural language text 1000. However, since form element 1008 is not contiguous, but is checked within the portion of the processed form, it is annotated as being checked within the annotated natural language text 1000.

Figure 11:
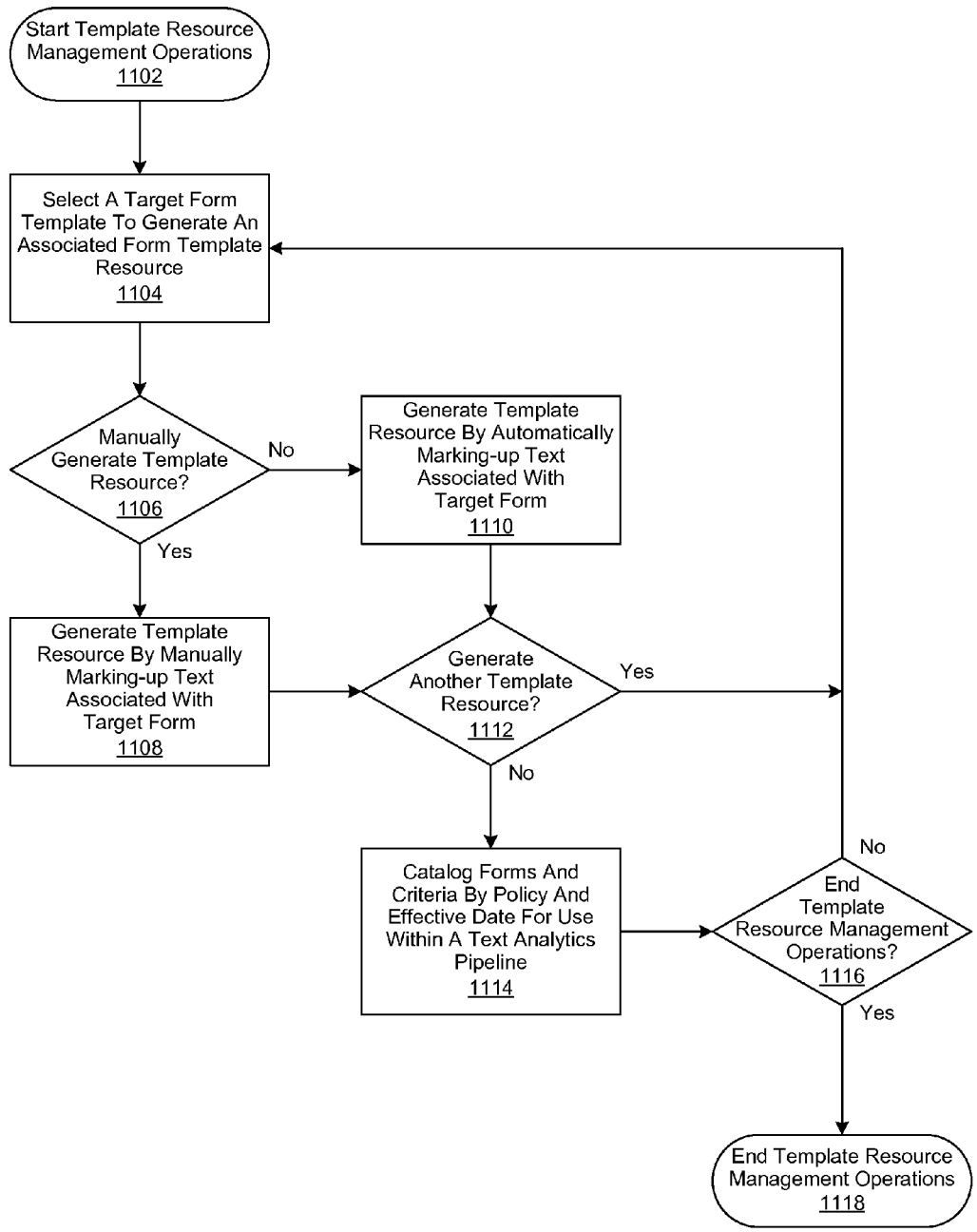
FIG. 11 is a generalized flow chart of form template resource management operations performed in accordance with an embodiment of the invention.

FIG. 11 is a generalized flow chart of form template resource management operations performed in accordance with an embodiment of the invention. In this embodiment, form template resource management operations are begun in step 1102, followed by the selection of a target form template in step 1104 to generate an associated form template resource. A determination is then made in step 1106 whether to manually generate the form template resource. If so, then a form template resource corresponding to the target form template is generated in step 1108 by using associated metadata to manually mark-up the target form template. However, if it is determined in step 1106 not to manually generate the form template resource, then a form template resource corresponding to the target form template is automatically generated in step 1110 by using associated metadata to automatically mark-up the target form.

Once the form template resource has been manually generated in step 1108, or automatically generated in step 1110, a determination is made in step 1112 whether to generate another form template resource. If so, then the process is continued, proceeding with step 1104. Otherwise, target forms and their associated form template resources are catalogued in step 1114, according to their corresponding policies and effective dates, for use by a text analytics pipeline. A determination is then made in step 1116 whether to end form template resource management operations. If not, then the process is continued, proceeding with step 1104. Otherwise, form template resource management operations are ended in step 1118.

Figure 12:
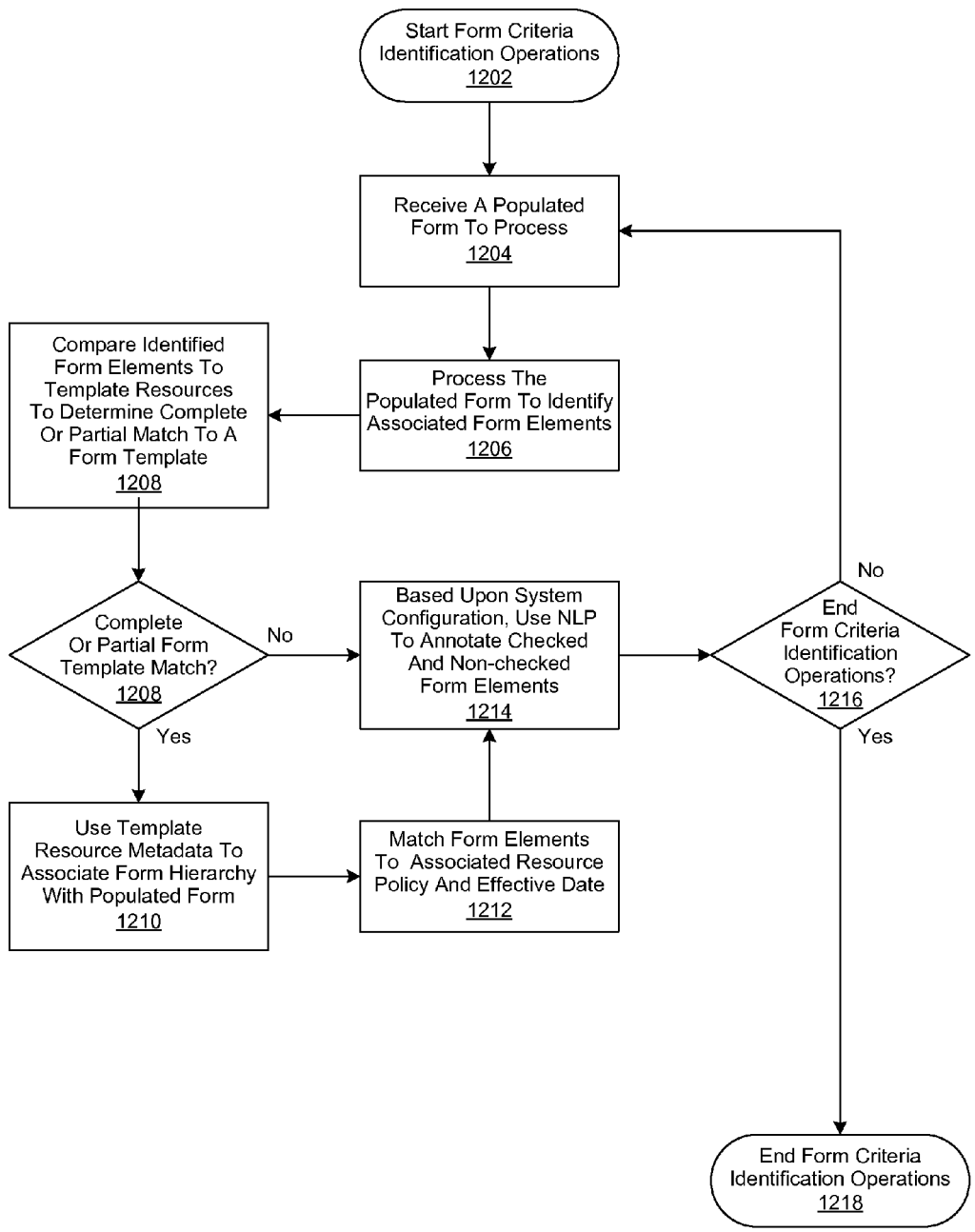
FIG. 12 is a generalized flow chart of form criteria identification operations performed in accordance with an embodiment of the invention.

FIG. 12 is a generalized flow chart of form criteria identification operations performed in accordance with an embodiment of the invention. In this embodiment, form criteria identification operations are begun in step 1202, followed by the receipt in step 1204 of a populated form to process. The populated form is then processed in step 1206 to identify its associated form elements. The identified form elements are then compared in step 1208 to various form template resources, described in greater detail herein.

A determination is then made in step 1208 whether there is complete or partial match between the populated form and an existing form template. If so, then form template resource metadata associated with the existing form template, described in greater detail herein, is used in step 1210 to associate the form template's hierarchy with the populated form. Individual form elements within the populated form are then matched to associated policy and effective dates, likewise described in greater detail, in step 1212. Thereafter, or if it was determined in step 1208 that there was not a complete or partial match between the populated form and an existing form template, Natural Language Processing (NLP) is used in step 1214 to annotate checked and non-checked form elements within the populated form.

In various embodiments, the NLP annotation performed in step 1214 is augmented by one or more policies, effective dates, or both, that were associated with individual form elements in step 1212. A determination is then made in step 1216 whether to end form criteria identification operations. If not, then the process is continued, proceeding with step 1204. Otherwise, form criteria identification operations are ended in step 12168.

Although the present invention has been described in detail, it should be understood that various changes, substitutions and alterations can be made hereto without departing from the spirit and scope of the invention as defined by the appended claims.

What is claimed is:

1. A system comprising:
   a processor;
   a data bus coupled to the processor; and
   a computer-usable medium embodying computer program code, the computer-usable medium being coupled to the data bus, the computer program code used for converting unstructured text within a form to resolve hierarchical references via a question/answer (QA) system executing on a hardware processor, the QA system having an associated form criteria identification system and comprising instructions executable by the processor and configured for:

applying natural language processing (NLP) to unstructured data within a form to identify elements of a form structure, the natural language processing being performed by the question/answer (QA) system executing on the hardware processor of an information handling system;

applying analytic analysis to the elements of the form structure and hierarchy metadata to identify a hierarchical structure and element placement in the hierarchical structure, the analytic analysis being performed by the form criteria identification system associated with the QA system;

identifying implicit selections within the form based on applying rules based on other selections and orientation to anchor terms to determine a completeness based upon aggregation of form elements, the identifying implicit selections being performed by the form criteria identification system associated with the QA system;

processing the form structure elements and the hierarchy metadata to logically re-assemble hierarchy in flattened forms for multi-layer sub-element anaphora resolution, the processing the form structure elements being performed by the form criteria identification system associated with the QA system;

receiving a question from a user via a computer network;

storing the flattened forms for multi-layer sub-element anaphora resolution within a repository associated with the QA system;

accessing the repository associated with the QA system in response to receipt of the question from the user; and, providing an answer to the question from the user to another information handling system, the another information handling system communicating with the QA system executing on the hardware processor of the information handling system via a computer network, the providing using the flattened forms stored within the repository associated with the QA system.

2. The system of claim 1, wherein the hierarchy metadata is captured from the form and identifies at least one member of the set of:
a structure associating child elements with parent elements;
one or more options type;
check box orientation; and
input data validation.

3. The system of claim 1, wherein rules within the hierarchy metadata are used to identify at least one member of the set of:
implicit checkmarks; and
incomplete forms.

4. The system of claim 1, wherein the hierarchy metadata is used to disambiguate the orientation of checkmarks to their anchor terms.

5. The system of claim 1, wherein the analytic analysis characterizes the form based upon a criteria.

6. he system of claim 1, further comprising providing options to adjust the metadata and analytic analysis, wherein the options comprise at least one member of the set of:
counts of sequential contiguous elements;
counts of contiguous elements;
matching criteria; and
term-checking rules.

7. A non-transitory, computer-readable storage medium embodying computer program code for converting unstructured text within a form to resolve hierarchical references via a question/answer (QA) system executing on a hardware processor, the QA system having an associated form criteria identification system, the computer program code comprising computer executable instructions configured for:

applying natural language processing (NLP) to unstructured data within a form to identify elements of a form structure, the natural language processing being performed by the question/answer (QA) system executing on the hardware processor of an information handling system;

applying analytic analysis to the elements of the form structure and hierarchy metadata to identify a hierarchical structure and element placement in the hierarchical structure, the analytic analysis being performed by the form criteria identification system associated with the QA system;

identifying implicit selections within the form based on applying rules based on other selections and orientation to anchor terms to determine a completeness based upon aggregation of form elements, the identifying implicit selections being performed by the form criteria identification system associated with the QA system;

processing the form structure elements and the hierarchy metadata to logically re-assemble hierarchy in flattened forms for multi-layer sub-element anaphora resolution, the processing the form structure elements being performed by the form criteria identification system associated with the QA system;

receiving a question from a user via a computer network;

storing the flattened forms for multi-layer sub-element anaphora resolution within a repository associated with the QA system;

accessing the repository associated with the QA system in response to receipt of the question from the user; and, providing an answer to the question from the user to another information handling system, the another information handling system communicating with the QA system executing on the hardware processor of the information handling system via a computer network, the providing using the flattened forms stored within the repository associated with the QA system.

8. The non-transitory, computer-readable storage medium of claim 7, wherein the hierarchy metadata is captured from the form and identifies at least one member of the set of:
a structure associating child elements with parent elements;
one or more options type;
check box orientation; and
input data validation.

9. The non-transitory, computer-readable storage medium of claim 7, wherein rules within the hierarchy metadata are used to identify at least one member of the set of:
implicit checkmarks; and
incomplete forms.

10. The non-transitory, computer-readable storage medium of claim 7, wherein the hierarchy metadata is used to disambiguate the orientation of checkmarks to their anchor terms.

11. The non-transitory, computer-readable storage medium of claim 7, the analytic analysis characterizes the form based upon a criteria.

12. The non-transitory, computer-readable storage medium of claim 7, further comprising providing options to adjust the metadata and analytic analysis, wherein the options comprise at least one member of the set of:
  counts of sequential contiguous elements;
  counts of contiguous elements;
  matching criteria; and
  term-checking rules.

13. The non-transitory, computer-readable storage medium of claim 7, wherein the computer executable instructions are deployable to a client system from a server system at a remote location.

14. The non-transitory, computer-readable storage medium of claim 7, wherein the computer executable instructions are provided by a service provider to a user on an on-demand basis.

\* \* \* \* \*